Aug. 9, 1949.　　　　　W. K. LONG　　　　　2,478,662
PORTABLE VISION TESTING KIT HAVING AN EYE TESTING
TARGET CHART AND ILLUMINATING MEANS THEREFOR
Filed Jan. 7, 1946　　　　　　　　　　　　5 Sheets-Sheet 1
FIG. 1.
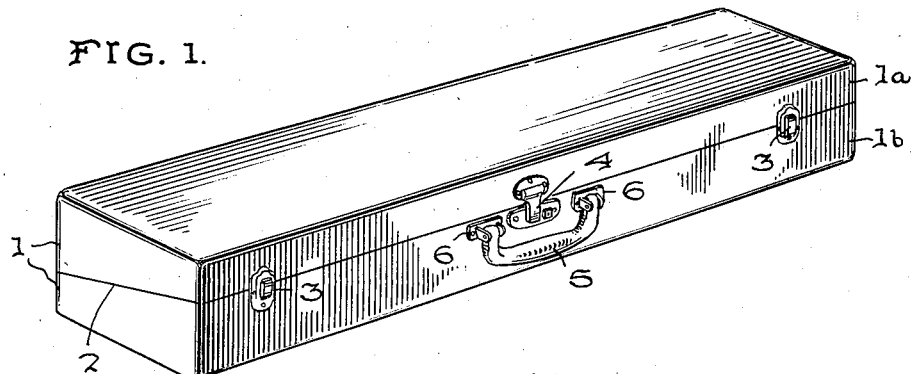
FIG. 2.
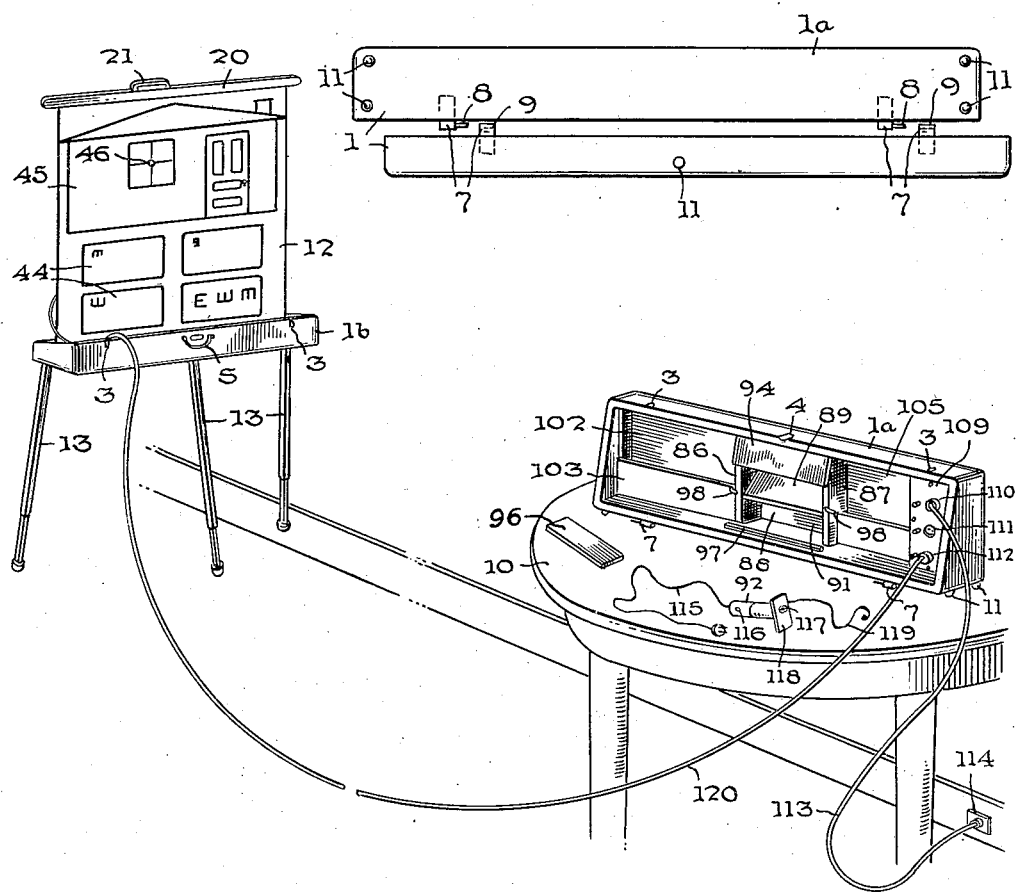
FIG. 3.
Inventor
W. K. Long
By Robb & Robb
Attorneys

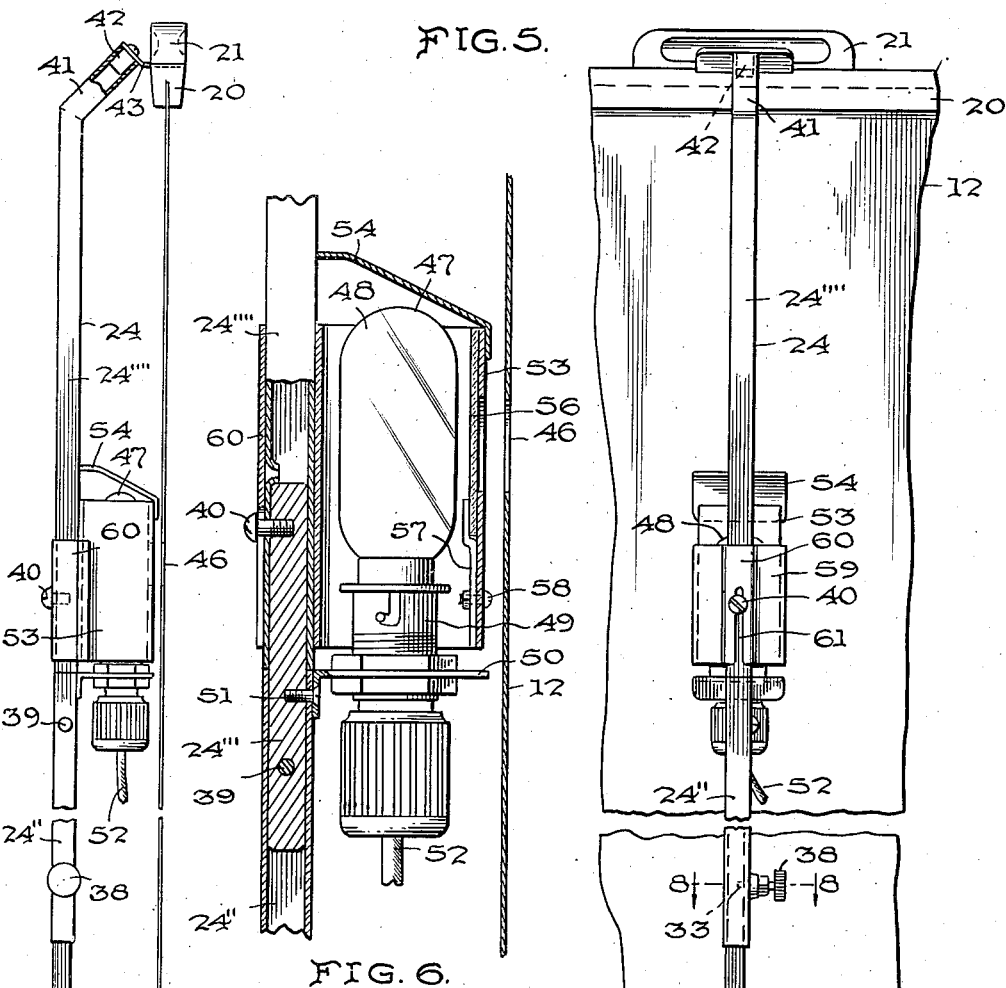
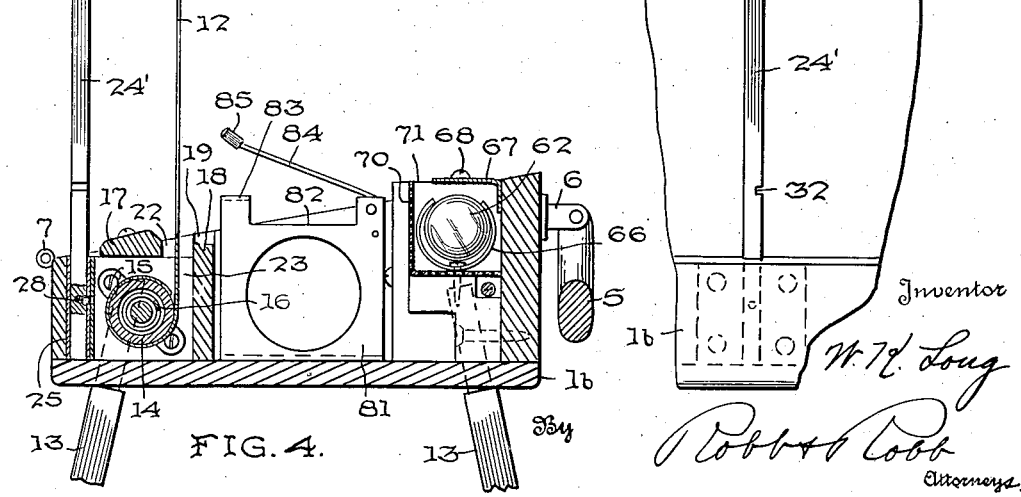

Aug. 9, 1949.  W. K. LONG  2,478,662
PORTABLE VISION TESTING KIT HAVING AN EYE TESTING
TARGET CHART AND ILLUMINATING MEANS THEREFOR
Filed Jan. 7, 1946  5 Sheets-Sheet 3
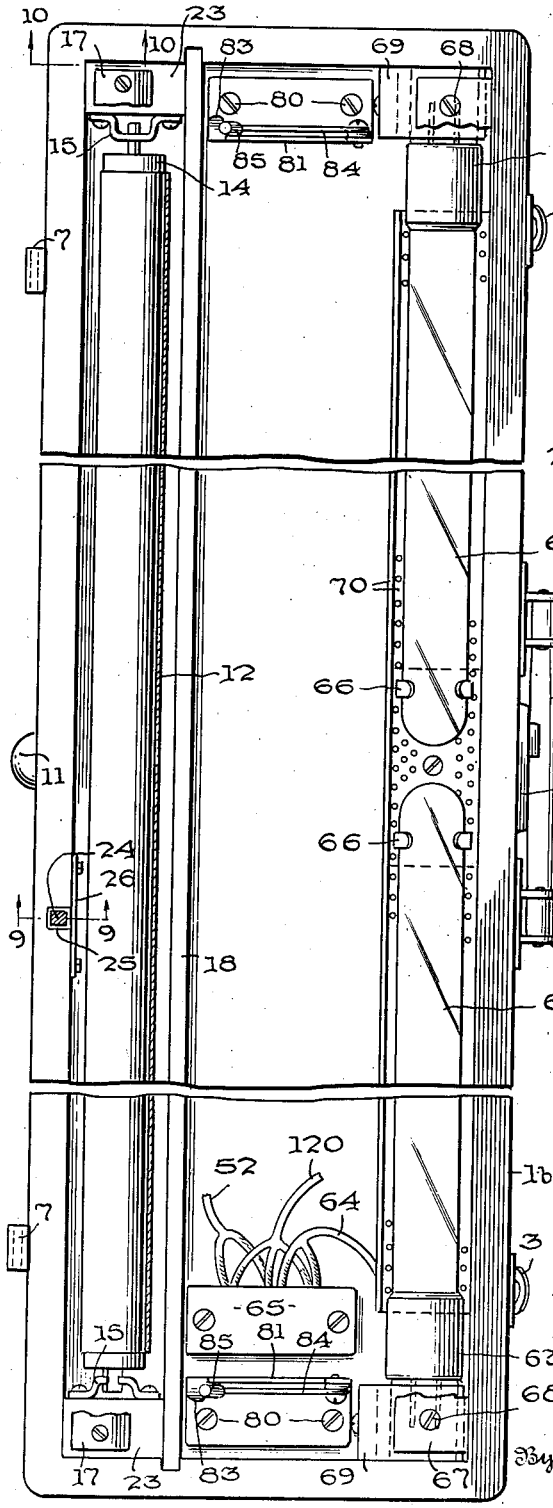
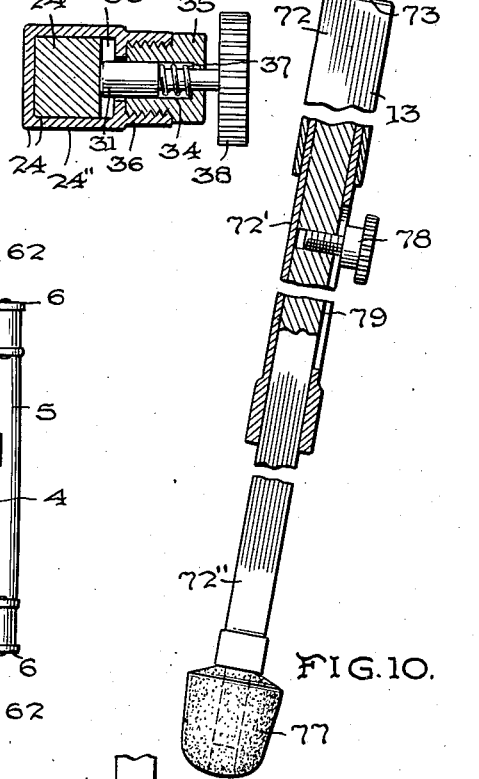
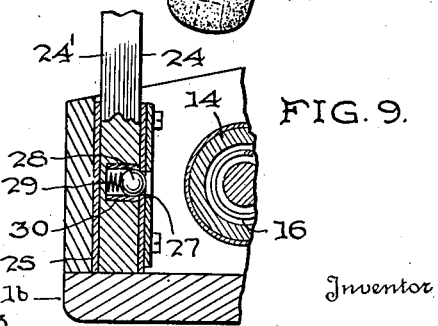

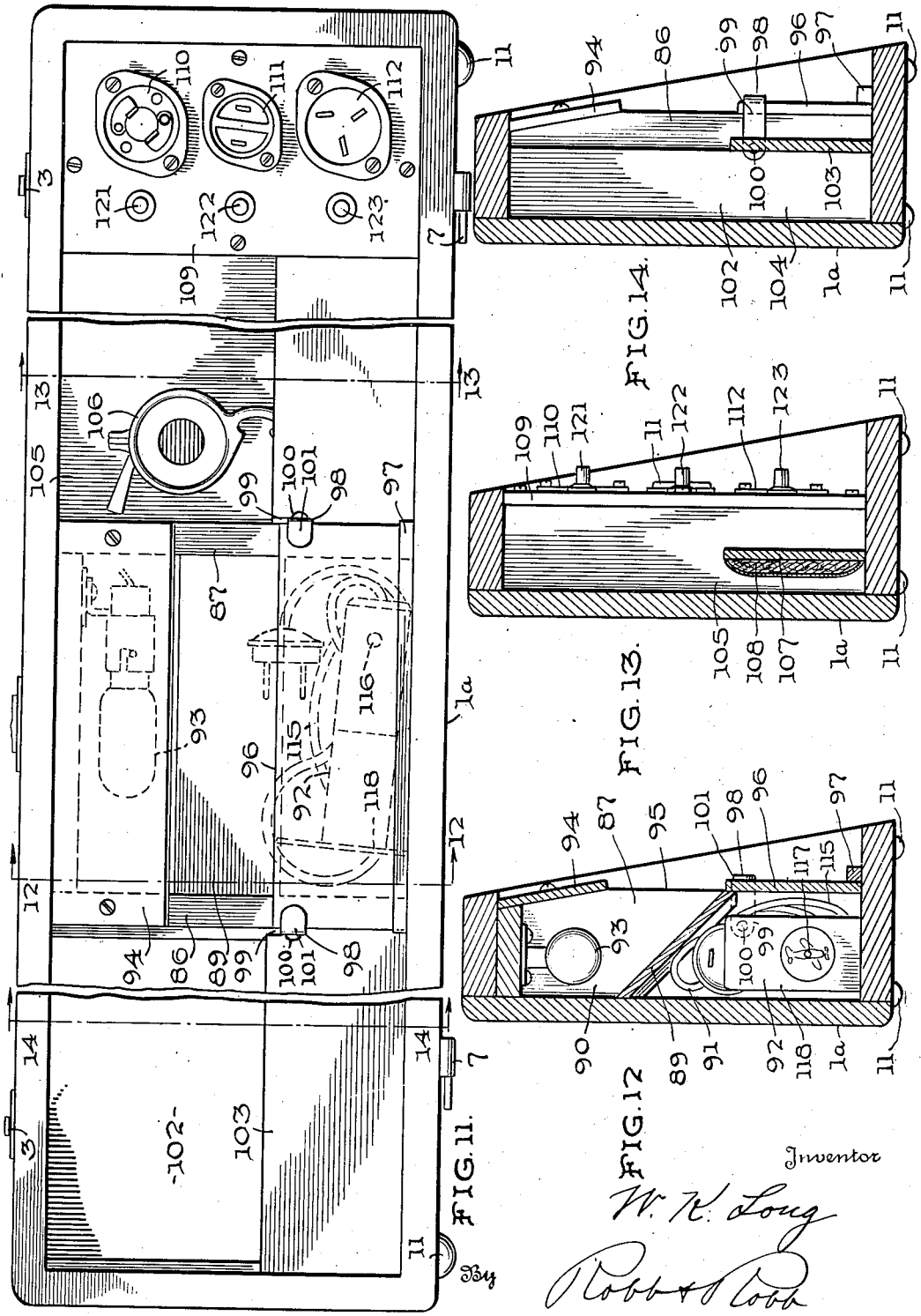

Aug. 9, 1949.　　　　　　　W. K. LONG　　　　　　2,478,662
PORTABLE VISION TESTING KIT HAVING AN EYE TESTING
　　　　TARGET CHART AND ILLUMINATING MEANS THEREFOR
Filed Jan. 7, 1946　　　　　　　　　　　　　　　5 Sheets-Sheet 5
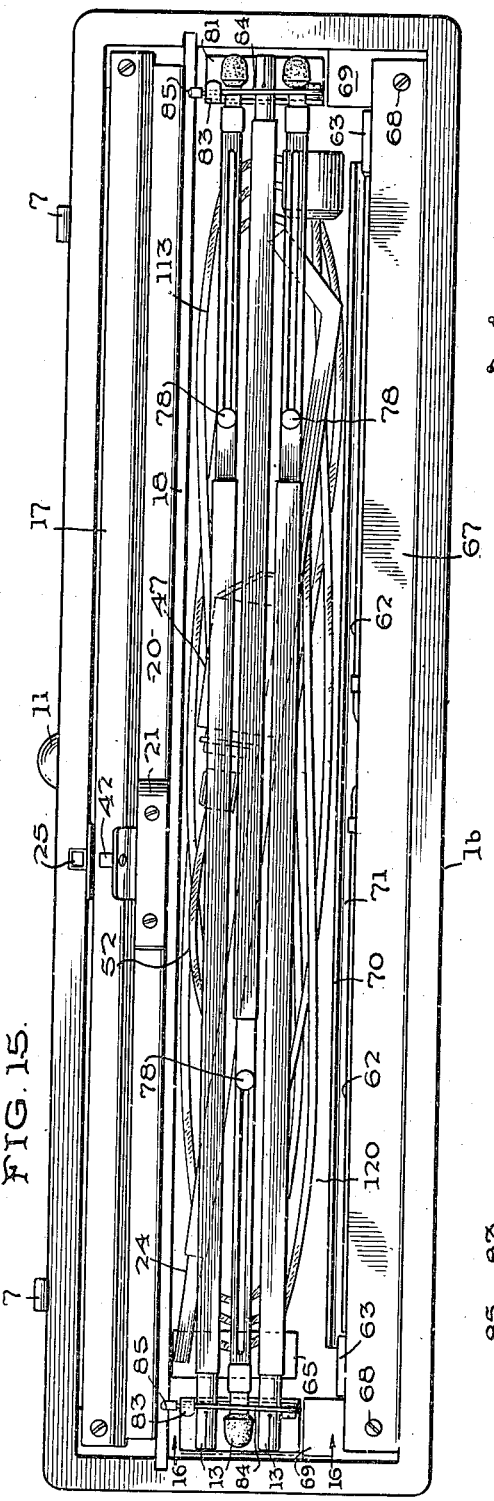
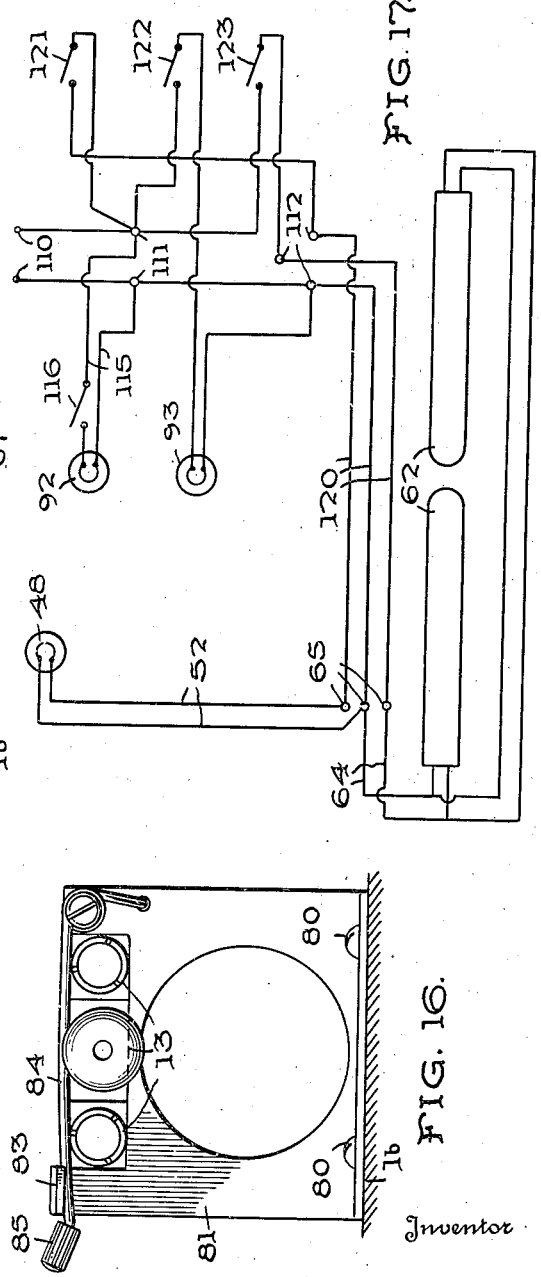
Inventor
W. K. Long
By Robb & Robb
Attorneys Patented Aug. 9, 1949

2,478,662

UNITED STATES PATENT OFFICE 2,478,662

PORTABLE VISION TESTING KIT HAVING AN EYE TESTING TARGET CHART AND ILLUMINATING MEANS THEREFOR

Walter K. Long, Auburn, N. Y., assignor, by mesne assignments, to Welch Allyn, Inc., Auburn, N. Y., a corporation of New York Application January 7, 1946, Serial No. 639,553

6 Claims. (Cl. 88—20)

The present invention appertains to vision testing equipment, and more especially, to improvements in such equipment which are of a character permitting the equipment to be assembled in the form of a compact, portable kit.

While the technique of vision testing is more or less standard procedure, the equipment required for the practice of the technique has heretofore been rather crude, cumbersome, fragile and does not readily lend itself to portability.

This invention has been developed with the view to materially simplifying the practice of a well-known vision test based upon tried and familiar techniques used by eye specialists for many years and devised by medical and educational experts primarily for use in schools and similar institutions, but not exclusively limited to such institutional fields.

More particularly, the invention comprises a portable kit which includes a carrying case in which the complete testing equipment is housed in a compact space when not in use, and the carrying case being separable into two parts or halves, constituting a desk unit and a test screen unit, respectively. The desk unit is preferably provided with illuminating means which is so arranged as to illuminate a limited work area on a desk or table on which this unit is placed when in use, so as to enable the tester to make notes or records of the tests without interference with the tests by the desk illumination. This desk unit is also preferably provided with a control panel, including detachable circuit connectors of the plug-in type, and control switches which are conveniently accessible to the tester for selective control of the desk illumination above referred to, as well as illumination of the test screen of the test screen unit, the latter being provided with selectively operable illuminating means.

When in use, the test screen unit is placed the required distance from the subject under test, with the subject seated near the tester, and both the subject and the tester being seated near or at the desk unit, so that at all times the tester has complete and selective control of the various illuminating means, as well as control of the subject, without leaving the position at the desk unit, and without leaving his or her seat.

In addition to the foregoing general and principal objects, the following objects of the invention, among others, may be enumerated:

The provision of detachable legs for the test screen unit, which may be employed to support this unit when in use, the legs being preferably adjustable in length to permit variation of the height of the test screen when required, and being housed and securely anchored within the carrying case when not in use;

The provision of a test screen made of durable, flexible material which is retractible by a spring-actuated roller into the test screen unit so as to eliminate unnecessary handling and to fully protect the test screen when not in use;

The provision of a removable, sturdy upright or standard of adjustable length to hold the flexible test screen in selectively extended, operative positions, and at the same time, serving to adjustably support a distance phoria test light whose position is accurately correlated to suitable test symbols or indicia depicted on the test screen, said upright or standard, with the phoria test light, fitting into the carrying case when not in use;

The provision of suitable electrical illuminating means of such form and arrangement as to produce the required amount and uniform distribution of light, particularly in relation to the test screen, which illuminating means are easily and conveniently replaceable, and are fully interchangeable with the more common types of electric lamps;

The provision of suitable detachable electrical conductors of appropriate length for connecting the desk unit to a source of electrical energy, and for interconnecting the desk unit with the test screen unit, said conductors being non-interchangeable so as to always correctly establish the proper circuits for the illuminating means and the control switches when not in use, and the length of the conductors interconnecting the desk unit and the test screen unit being such that when extended the full length therebetween, measures the distance required for the test when the subject is seated adjacent to the desk unit;

The provision of suitable compartments in the desk unit and the test screen unit to accommodate the equipment referred to above in an orderly and compact manner, and such other auxiliary equipment and supplies as may be required, with complete protection against damage being afforded to such equipment and supplies when not in use.

Other and further objects and advantages of the invention will be hereinafter described and the novel features thereof defined by the appended claims.

In the drawings:

Figure 1 is a perspective view of the vision testing equipment as housed in a carrying case, with the case closed;

Figure 2 is a composite view in rear elevation, showing the separable hinges for the two halves of the carrying case, one half constituting a desk unit, and the other half a test screen unit, the two units being shown in this view displaced slightly relative to each other, with the hinges separated;

Figure 3 is a composite perspective view showing the respective desk and test screen units set up in their proper relation to each other, as when in use;

Figure 4 is a view in vertical section taken through the test screen unit in its set-up condition, certain of the parts being shown in elevation;

Figure 5 is a fragmentary detail view in rear elevation of that portion of the test screen unit which embodies the upright or standard which holds the test screen in extended position, and which also supports the distance phoria test light;

Figure 6 is an enlarged, detail view, partly in elevation and partly in vertical section, showing more particularly the details of the distance phoria test light assembly and its mounting as applied to the supporting upright;

Figure 7 is a view in top plan of the test screen unit as viewed looking downwardly into the upper open side of that half of the carrying case, certain of the parts being shown in section and others broken away to particularly show the test screen roller and its mountings, and the screen illuminating lamps and their mountings and associated parts;

Figure 8 is a horizontal, sectional view through the test screen supporting upright or standard, as taken on the line 8—8 of Figure 5, and showing the details of the locking instrumentalities for releasably locking the upright in selective positions of lengthwise adjustment;

Figure 9 is a fragmentary, detail, sectional view taken on the line 9—9 of Figure 7, showing the details of the socket for the lower end of the screen supporting upright or standard, and the detent means for yieldably restraining the upright against displacement from the socket;

Figure 10 is a fragmentary, detail, sectional view taken on the line 10—10 of Figure 7, showing partly in section and partly in elevation, one of the adjustable supporting legs for the test screen unit, and the leg socket;

Figure 11 is a view in front elevation on an enlarged scale of the desk unit shown in Figure 3, as seen on looking towards the open front side of that half of the carrying case;

Figure 12 is a sectional view taken on the line 12—12 of Figure 11, and particularly showing the desk lamp compartment and the near phoria tester storage compartment therebelow;

Figure 13 is a sectional view taken on the line 13—13 of Figure 11, showing particularly another storage compartment for the holding and storage of such auxiliary equipment as spectacles and the like;

Figure 14 is a sectional view taken on the line 14—14 of Figure 11, showing still another compartment for the storage and holding of such other auxiliary equipment and supplies as record forms, instruction manuals, and the like;

Figure 15 is a plan view of the test screen unit as seen looking towards the open side of that half of the carrying case, with the test screen retracted, the screen supporting standard and the legs dismounted, the electrical conductors detached, and all disposed and anchored in that half of the carrying case, ready for reassembling the two halves of the carrying case together and closing the case as in Figures 1 and 2, for carrying or for storage;

Figure 16 is a fragmentary, detail, sectional view taken on the line 16—16 of Figure 15, and particularly illustrating one of the leg holding and anchoring means as used when the legs and other parts of the test screen unit are knocked-down as illustrated in Figure 15; and Figure 17 is a wiring diagram of the electrical circuits under the conditions provided when the equipment is set up and ready for use.

Like reference characters designate corresponding parts in the several figures of the drawings.

Referring first to Figures 1 to 3 inclusive, I generally denotes a carrying case of elongated, generally rectangular form, such case being made of any suitable material with or without a covering of fabricord or other decorative material giving a neat and attractive appearance to the case. The carrying case 1 is divided into two sections or halves, with the division or separating lines lying in an inclined plane as indicated at 2. This arrangement of the separating or division lines of the carrying case causes the depth of each half of the carrying case to vary from front to back, and the advantages of such variation in depth will hereinafter more fully appear.

At the front side of the carrying case 1, the case is preferably provided with two fasteners of the hasp type, as indicated at 3, 3, said fasteners being located adjacent to the opposite ends of the case. At the center of the case, there is also preferably provided a latch generally designated 4, of any appropriate type, but preferably of the type which may be locked and unlocked at will. A handle 5 is also attached to the front side of the case, and is preferably mounted on the lower half of the case, as seen in Figure 1, said handle being pivotally attached to the case by the fastenings 6, 6.

At the rear of the case 1, as best seen in Figure 2, the case is provided with a pair of hinges 7, 7, of the separable type, said hinges being located near the opposite ends of the case. According to the hinges shown in the drawings for purposes of illustration, one section of each pair of hinges is attached to the upper half of the carrying case 1, and is provided with a laterally extended pintle 8, and the complementary half of each pair of hinges is mounted on the lower half of the case, and is provided with a socket or barrel 9 to receive the pintles 8 when the hinges are joined together. Thus, by relatively displacing the two sections or halves of the carrying case in an endwise direction, the hinges 7, 7 may be separated at will to enable each section or half of the carrying case to be handled and set up separately from the other section or half. To reassemble the carrying case, the hinges of the respective sections are reengaged by relative endwise displacement of the case sections in the opposite direction, as will be obvious from the drawings.

It will be noted from reference to Figures 1 and 2 that the rear wall or side of the upper section or half of the carrying case, which upper section is designated 1a, is substantially greater in height than the front wall of this section, for the purpose of providing a broad and stable base on which the upper section 1a may be rested when in use. The position of this section 1a when in use is shown in Figure 3, with the section 1a resting upon a desk, table or other supporting work surface 10. To prevent this section of the case from marring, scratching or otherwise damaging the work surface, the back of the wall which forms the bottom of the section 1a when in use, is preferably provided with a plurality of resilient cushions 11 located adjacent the respective corners thereof. This section of the carrying case, designated 1a, will be hereinafter referred to as the desk unit.

The other section of the carrying case, designated 1b, being the lower section shown in Figures 1 and 2, will be hereinafter referred to as the test screen unit, since this section is provided with a test screen or chart 12 which will be hereinafter more fully described. In setting up the test screen unit 1b, it may be supported upon a desk, table or other supporting surface located at a suitable distance from the desk unit 1a, but is more preferably supported by a plurality of adjustable legs designated 13, the latter snugly fitting at their upper ends into suitable sockets formed in the bottom of the test screen unit 1b, and being arranged so as to provide adequate stability for this unit. To this end, two of the legs 13 are attached to the bottom of the unit near the back edge and adjacent to the opposite ends of the unit, as viewed in Figure 3, and the third leg is attached to the bottom of the case near the front edge and at the center thereof, as viewed in this figure. For increased stability, the legs are preferably inclined so as to be spread wider apart at their lower ends than at their upper ends, thus forming a tripod in effect.

Referring now to Figures 4 to 10 inclusive, and having particular reference to the details of the test screen unit 1b, it will be seen that the test screen 12, which is preferably made of suitable durable material, such as heavy linen or other fabric, is flexible and is mounted upon a roller 14 which is disposed within this section of the carrying case at the back thereof and extends lengthwise of the case. The opposite ends of the roller are suitably fixed in supporting brackets, as indicated at 15, and the roller is free to rotate in said brackets in the manner of a window shade roller from which the usual ratchet mechanism is omitted. A spring 16 at one end of the roller serves to continuously urge the roller in one direction of its rotation, thereby always tending to wind the flexible test screen 12 onto the roller and retract the test screen into the case of the unit 1b. At the upper side of the roller and attached at its opposite ends to the back of the case section of the test screen unit, there is preferably provided a guard strip designated 17 which protects the roller and the test screen wound thereon; this strip 17 terminating at its forward edge in spaced relation to a partition 18 extending upwardly from the bottom of the case and preferably slidably mounted in grooves or channels 19 formed in the respective opposite end walls of the case.

The free edge of the test screen 12 is secured to a rail or bar 20 made of wood or other suitable rigid material, which serves to hold the test screen 12 in a flat condition when the test screen is drawn upwardly from about the roller, and the bar 20 is provided at its upper side with a handle or finger-piece 21 which may be conveniently availed of to manipulate the screen in withdrawing the same from the roller 14. When the test screen 12 is retracted into the case section of the test screen unit 1b by the action of the spring 16, which causes the screen to be wound upon the roller 14, the bar 20 overlies the space 22 between the front edge of the guard 17 and the partition 18, thereby completely closing the space, with the opposite ends of the bar 20 resting upon the supporting blocks 23 which are provided at the opposite ends of the case section and which lie between the roller supporting brackets 15, 15 and the ends of the case section, the roller supporting brackets being secured to the inner faces of these respective blocks 23, and the guard rail 17 being secured to the upper sides of these blocks, as more particularly illustrated in Figures 4 and 7.

In order to support and sustain the test screen 12 in an extended position, there is provided a screen supporting upright or standard designated 24, the lower end of which is adapted to be inserted into a socket 25 provided at the back of the case section of the test screen unit 1b, said socket preferably having the form of a hollow metal shell of rectangular outline which is recessed in the rear wall of the case section and attached thereto by a bracket 26 abutting against the inner face of said rear wall. The shell of this socket is cut away at 27, as best seen in Figure 9, for cooperation with a ball detent 28 mounted in the standard 24 adjacent to the lower end thereof, said ball detent 28 being normally urged outwardly by the pressure of a spring 29 disposed within a cup-like shell 30 which is recessed in the standard. The outer edge of the cup-like shell 30 is somewhat constricted to prevent displacement of the ball detent 28 therefrom, but the ball detent normally projects beyond the front face of the standard 24 for a distance sufficient to seat in the cutaway part 27 of the socket 25, when the standard is inserted in the socket, to yieldably restrain the standard from accidental displacement from the socket.

The lower portion of the standard 24 preferably has the form of a solid bar of square cross-section, as indicated at 24', and which is of a size to snugly fit into the socket 25. This solid bar section is telescopically slidably in a hollow section of corresponding shape, designated 24''. Mounted adjacent the lower end of the hollow section 24'' is a spring-pressed detent 31 having the form of a plunger which is selectively engageable with spaced notches 32 and 33 formed in the solid bar section 24'. The plunger 31 is slidably mounted in a recess 34 formed in a nut member 35, the latter being threadedly engaged with a threaded extension 36 provided on one side of the hollow section 24'' of the standard. A spring 37 is disposed in the recess 34 behind the plunger 31, and serves to normally yieldably urge the plunger towards the standard section 24', the plunger being extended outwardly through the nut 35 and terminating at its outer end in a finger-piece or button 38 by means of which the plunger may be conveniently retracted to disengage the same from the notches 32, 33 for the purpose of permitting the standard sections 24' and 24'' to be collapsed by telescopic movement relative to each other.

The hollow standard section 24'' is joined at its upper end to a short solid bar section 24''' which fits into the same, as clearly seen in Figure 6, this attachment being made in any suitable manner, as by means of a screw 39. The bar section 24''' is in turn extended and is received in the lower end of another hollow section 24'''', and is attached thereto in any suitable manner, as by a screw 40. The upper end of this latter hollow section 24'''' is forwardly inclined, as shown at 41, and forms a socket in the upper end of which is adapted to be seated a pin 42 fixed to an arm 43 which is in turn fixed to the upper side of the bar or rail 20 at the upper end of the test screen 12. This arm or bracket 43 preferably lies between the finger-piece 21 and the rail 20, as shown in Figure 4.

It will be understood from the foregoing that the parts 24', 24'', 24''' and 24'''' and 41, when in their assembled form, make up the standard or upright 24, and that this standard is perfectly rigid and will remain in an upright position when the lower end of the standard is inserted in the socket 25. By adjusting the length of the standard 24, as permitted by the selective engagement of the plunger 31 with the notches 32 and 33, the height of the upper end of the standard, and consequently of the socket 41, may be varied to expose more or less of the test screen 12 when the pin 42 on the latter is engaged in the socket 41. Additional notches may be provided in the standard, besides those designated 32 and 33, if desired, to increase the number of positions of selective adjustment of the test screen, the latter being provided on the front face thereof with suitable test symbols or indicia, as seen in Figure 3. These symbols or indicia may be varied according to the tests to be performed, or, if preferred, test screens bearing different symbols or indicia may be substituted one for the other. For convenience, a plurality of test screens may be mounted in the same case section of the test screen unit 1b, in which event, the test screens may be selectively extended and engaged with the standard 24.

According to the form of the test symbols illustrated in Figure 3, they are of two types and are intended for use in conducting separate tests, but it is to be understood that the invention is not limited to the arrangements of symbols as shown. The symbols shown in the rectangular outlines depicted on the lower portion of the test screen 12 in Figure 3, and designated 44, are of the type known as the Snellen Illiterate E. These symbols are employed for the purpose of sorting out cases in which there is a low visual acuity, and the symbols are so arranged as to minimize the possibility of memorizing the same.

On the upper portion of the test screen, there is depicted the general outline of a house, as indicated at 45, said outline including the representation of a door and a window. At the center of the window, a hole 46 is provided in the test screen, behind which hole is mounted a test light which is shown in Figures 4 to 6 inclusive, and is generally designated 47. This test light 47 is known as the distance phoria test light, and its purpose is to determine vertical and horizontal muscle imbalance at a distance and a check of binocular vision.

The distance phoria test light includes an electric lamp 48 which is removably mounted in a socket 49, the latter being secured to a bracket 50, which is in turn attached by a screw 51 to the screen supporting standard 24. Electrical conductors 52 are attached to the socket 49 to establish a circuit to the lamp 48 in a conventional manner.

Extending about the lamp 48 is a housing 53 which is arranged in spaced relation thereto and includes an upwardly and rearwardly inclined cover 54 which overlies the upper extremity of the marginal walls of the housing 53 to permit the escape and dissipation of heat from the lamp and to prevent the light rays from extending upwardly from the lamp. The front wall of the housing 53 is provided with an opening 55 therein adapted to be registered with the opening 46 in the test screen 12. Behind the opening 55 is mounted a transparent window 56, said window being held in position by a bracket 57 attached to the front wall of the housing by a screw 58 or other equivalent supporting means. The housing 53 is attached at its rear side to a bracket 59 which is suitably secured to the opposite rear corners of the housing, as by soldering or welding. The bracket is offset in a rearward direction to form a socket 60, corresponding in cross-section to the cross-section of the upright or standard 24 in the zone of the screw 40 which attaches the standard sections 24''' and 24'''' together. The rear wall of the bracket socket 60 is vertically slotted, as at 61, to engage about the screw 40, between the head of the screw and the rear face of the standard 24. Thus, by loosening the screw 40 slightly, the bracket 59, together with the lamp housing 53, can be vertically adjusted on the standard 24, as may be required to accurately align the opening 55 in the housing with the opening or aperture 46 in the test screen 12. When this adjustment has been effected, the screw 40 may thereupon be tightened to firmly secure the lamp housing in its adjusted position.

Disposed within the test screen case section 1b, and located in forwardly spaced relation to the test screen 12, near the bottom of the latter, are means for illuminating the front face of the test screen when the test screen is vertically extended from the case section. These illuminating means have the form of two electric lamps, designated 62, 62, of elongated and generally tubular form, as best seen in Figures 4 and 7. While two such lamps have been shown in the drawings, it will be understood that the invention is not limited to this precise arrangement and form of the illuminating means, since other forms of electric lamps of the more common type may be substituted for the lamps 62, 62, and may be freely interchanged therewith, as well as with the lamp 48. According to the arrangement as illustrated, each of the lamps 62, 62 is mounted in a socket 63, there being one socket at each of the opposite ends of the test screen case section 1b, at the respective inner front corners thereof. The sockets 63, 63 are preferably of the plug-in type, and are plugged into suitable receptacles in the extreme corners of the case section 1b, and the receptacles are in turn connected in parallel circuits, and from these parallel circuits, conductors 64 lead to a terminal block 65 attached to the bottom of the case section 1b adjacent to one end thereof.

The outer extremities of the lamps 62, 62 are engaged by resilient clips 66, 66 which are attached to the bottom of case section 1b, and embrace the lamps to yieldingly support the same, thereby reducing jarring of the lamps by shocks imparted to the case section through careless or rough handling, while at the same time, permitting the lamps to be removed for purposes of substitution or replacement, when required. At the front of the case section 1b, and overlying the lamps 62, 62, is a baffle 67 which is attached at its opposite ends by screws 68, 68 to the upper faces of suitable supporting blocks 69, 69. This baffle 67 prevents the light from the lamps 62, 62 from being directed forwardly towards the subject under test, and aids in confining the light rays to a direction which serves to illuminate the test screen 12 when in its extended position.

At the inner side of the lamps 62, 62 and extending below the same, there is arranged a perforated screen 70 which has the effect of uniformly diffusing the light rays, particularly over the lower area of the test screen, and which otherwise would receive more intense illumination than the upper area of the screen. It will be observed that the rear edge of the baffle 67 terminates in forwardly spaced relation to the upper edge of the vertical side of the perforated screen 70, thereby forming an uninterrupted slot 71 through which the light rays may freely pass to the upper portion of the test screen 12, thus compensating for the greater distance this latter area is from the lamps. As a result of this arrangement just described, the illumination is substantially uniform over the entire area of the test screen when fully extended to the position as shown in Figure 4, or when only partially extended to expose only the upper portion of the test screen which bears the test symbols 45 and the distance phoria test light aperture 46.

As previously described, the test screen unit 1b is supported when in use by a plurality of detachable legs 13. The details of these legs will be best understood from reference to Figure 10 of the drawings, from which it will be seen that the upper portion of each leg is preferably hollow and of square cross-section, as indicated at 72. The respective sections 72 terminate at their upper ends in cylindrical extensions 73 of hollow circular cross-section. These extensions are slotted or slit at intervals about the periphery thereof, as indicated at 74, and these slits are extended downwardly for a substantial distance from the extreme upper ends of the extensions 73, so that the upper ends of the extensions are slightly contractible and expansible for purposes of producing a snug fit in the tubular sockets 75 which are mounted in the bottom of the test screen unit 1b. In order to aid in expanding the extensions 73, each extension has disposed therein a cork, rubber, or other plug 76 of resilient material.

At the lower end of each leg section 72, the leg is reduced in size and extended downwardly as indicated at 72'. Slidably mounted in each of the leg sections 72' is a circular leg section 72'', carrying at its lower end a resilient foot-piece 77, these resilient foot-pieces serving to prevent the legs from scratching or marring a floor, and also preventing the legs from sliding readily on the floor. Attached to each leg section 72'' is a thumb-screw 78 which extends through an elongated slot 79 in the hollow leg section 72'. By loosening the thumb-screws 78, each of the legs 13 may be adjusted to the desired length independently of each other in order to cause the test screen 12 to assume a vertical position when the test screen unit 1b is set up for test purposes. On adjusting the length of the respective legs, the thumb-screws 78 are thereafter tightened to maintain the legs in their adjusted positions.

The legs 13 are of such length that when collapsed to their minimum length and removed from the sockets 75, they will fit within the case section of the test screen unit 1b. This case section is accordingly provided with suitable means for supporting and anchoring the legs in a stored condition therein, said supporting and anchoring means being best illustrated in Figures 4, 7, 15 and 16, Figure 15 showing the test screen unit in its completely knocked-down position, ready for reassembly with the desk unit 1a preparatory to storage or transporting the test equipment. At the opposite ends of the case section of the test screen unit 1b, and secured by screws 80 to the bottom of this case section is a pair of supporting brackets 81, 81, each preferably formed of sheet metal, and the upper edge of each bracket being recessed, as at 82. The length of this recess 82 in the brackets 81, 81 is such as to receive the three legs 13 in side-by-side relation to each other and resting across the brackets 81, 81, as shown in Figure 15. In order to anchor the legs 13 in their stored or housed condition in the case section of the test screen unit 1b, each of the brackets 81, 81 is provided with a laterally offset ear 83 at the upper rear corner thereof, and attached to the upper front corner of each bracket is a resilient clamping member 84 having the form of relatively heavy gauge spring wire, terminating at its free end in a finger-piece 85. The clamping member 84 is adapted to overlie the legs 13 when disposed in the recesses 82 in the brackets 81, 81, and by laterally springing the clamping members 84, 84 so as to clear the ears 83, 83, and depressing the clamping members 84, 84 so as to engage the same beneath the ears, the legs 13 will be firmly clamped to the brackets 81, 81, thus preventing any movement of the legs or rattling of the same while in their stored or dismounted position. Inasmuch as the legs 13 are substantially spaced above the bottom of the case section of the test screen unit 1b when so stored and anchored, sufficient room is afforded beneath the legs to store or house other parts of the equipment, including the standard 24 and the test light assembly which is carried by the latter. When such equipment is so stored in the space beneath the legs, as illustrated in Figure 15, the legs prevent displacement of the equipment until such time as the clamping means 84, 84 are released and the legs are removed. By suitably packing this equipment in the space beneath the legs, rattling or shifting of the same in the case section may be prevented.

Referring now to the desk unit 1a, as shown in Figures 3 and 11 to 14 inclusive, it will be seen that the carrying case section of this unit is divided into a plurality of compartments by spaced partitions 86 and 87. The compartment at the center of the case section, designated 88, is in turn divided by a downwardly inclined partition 89 into an upper lamp compartment 90 and a lower storage compartment 91, the latter being adapted to contain and store such auxiliary equipment as a near phoria tester 92, which will be hereinafter more specifically described.

The lamp compartment 90 has mounted therein an electric lamp 93 which is disposed behind a front baffle 94 which extends downwardly from the upper edge of the carrying case section of the desk unit 1a, when resting in the position shown in Figure 3, to a point slightly below the bottom of the lamp 93. Thus, the light rays from the lamp 93, are prevented from being directed forwardly into the eyes of the operator or tester when seated in front of the desk unit 1a, and the light rays are confined to a limited area on emerging through the space 95 between the lower edge of the baffle 94 and the upper side of the downwardly inclined partition 89, and serve to illuminate the work surface on the table or desk in the zone immediately adjacent to the central portion of the desk unit 1a.

At the front of the lower storage compartment 91, below the compartment 90, there is provided a removable cover 96, said cover being disposed in an upright position when the desk unit 1a is resting in the position shown in Figure 3. The lower edge of the cover 96 is received behind a guide rail 97 extending across the front of the compartment 91 in forwardly spaced relation to the vertical partitions 86, 87. Pivotally secured to the respective partitions 86, 87 is a pair of latch members 98, 98, each of said latch members including an arm 99 extending forwardly from the pivot 100 to the front edge of its partition on which it is pivotally mounted, and each arm 99 terminating in a laterally offset clasp 101 adapted to engage over the upper corner of the cover member 96 at the front thereof, when the latch member is swung into the position illustrated in Figure 12. In order to remove the cover member 96 to afford access to the storage compartment 91, the latch members 98, 98 are swung upwardly for a distance sufficient to clear the upper end of the cover 96, thereby permitting the cover to be lifted upwardly and forwardly until it is disengaged from behind the rail 97.

At one side of the central compartment 88, there is formed a storage compartment 102 for the purpose of receiving and storing such equipment or supplies as test record forms, instruction manuals, etc. At the front of this compartment 102, there is provided an upright panel 103 which is forwardly spaced from the rear wall of the carrying case section of the desk unit 1a, as best shown in Figure 14, thus forming a space 104 behind the panel 103 for the reception of the equipment or supplies above referred to.

At the opposite side of the central compartment 88, there is provided another compartment 105 for the reception and storage of such equipment as spectacles, Maddox rods mounted in spectacle frames, and the like. In Figure 11 there is illustrated one of these Maddox rod units mounted in spectacle frames, as indicated at 106, it being understood that two sets of these Maddox rod units are required to test both vertical and horizontal muscle imbalance. In addition, two sets of spectacles are also preferably provided, one set being for small children and the other set being for larger children or adults. To retain these Maddox rod and spectacle units in the compartment 105, there is provided across the front of the compartment, in forwardly spaced relation to the rear wall of the carrying case section of the desk unit 1a, an upright panel 107, as best seen in Figure 13. The rear face of this panel is preferably padded, as indicated at 108, to serve as a cushion for the Maddox rod and spectacle units, and to securely hold these units in the compartment 105, as by wedging the units between the padding 108 and the back wall of the carrying case.

At one extreme end of the desk unit 1a, there is provided a control panel 109, said control panel having mounted thereon a plurality of detachable connectors or receptacles of the plug-in type, respectively designated 110, 111 and 112. The receptacle 110 is adapted to be connected to a suitable source of electrical energy, as by means of a detachable extension cord 113, shown in Figure 3, leading from the receptacle 110 to a wall outlet 114. The receptacle 111 is adapted to be connected to the near phoria tester 92, shown in Figure 3, this tester being provided with an extension cord 115 leading into the handle end of the tester unit which is provided with a push-button switch 116 for controlling the energization of a small electric lamp mounted therein. The light rays from the lamp in this tester unit are directed through a small pin hole 117 at the forward end of the tester unit 92, said forward end being provided with a laterally extended plate 118 to one corner of which is connected a cord or string 119, of suitable length for measuring the distance the tester unit is to be held from the eye of the subject in the performance of this phase of the test.

The receptacle 112 on the control panel 109 is adapted to be connected to a conductor cord 120, shown in Figure 3, this conductor cord being of the three-wire type and leading from the receptacle 112 to the test screen unit 1b. At the test screen unit, the conductor cord 120 is connected to the terminal block 65, as shown in Figure 7. The conductor cord 120 is preferably of such length than when fully extended from the desk unit 1a, it measures the required distance the test screen unit 1b should be located from the desk unit 1a for the performance of the tests. When the conductor cord 120 is disconnected from the receptacle 112, and the extension cord 113 is disconnected from the receptacle 110 and the wall outlet 114, both of these cords may be stored in the carrying case section of the test screen unit 1b, beneath the legs 13, as shown in Figure 15.

The control panel 109 is also provided with a plurality of switches respectively designated 121, 122 and 123 of any suitable type. These switches have been illustrated in the drawings as being of the turn-button type, but it is to be understood that the invention is not limited to any particular form of the switches. The switch 121 serves to control the distance phoria test lamp 48, while the switch 122 serves to control the circuit to the desk lamp 93. The switch 123 controls the test chart general illuminating lamps 62, 62. The electrical circuits for these lamps and the control switches are diagrammatically shown in the wiring diagram of Figure 17.

In setting up the testing equipment, the carrying case in its closed condition shown in Figure 1 is placed on a table or chair, with the side containing the three leg-sockets 75 down. The latches 2, 3 and 4 are then released and the case is opened for the purpose of permitting the removal of the legs 13. To permit such removal of the legs, the anchoring clasps 84, 84 are disengaged from the ears 83, 83 in the manner previously described. Following removal of the legs 13 from the carrying case, the case is then closed and turned on its side with the handle 5 up, in which position the legs 13 may then be inserted in the sockets 75. The carrying case is then placed table-like on the floor, resting upon the legs 13, in which position the case is again opened, and the upper half, constituting the desk unit 1a, is removed by disengaging the separable hinges 7, 7. The desk unit 1a is then placed upon a desk, table, or other supporting surface, in the position as shown in Figure 3. The test screen unit 1b is moved to a suitable distance from the desk unit so that it will be twenty feet from the position of the subject when seated adjacent to the desk unit, with the subject facing the test screen unit.

To prepare the test screen for use, the upright or standard 24 is inserted in the socket 25, following which the test screen 12 is raised by pulling upwardly on the handle or finger-piece 21 until the pin 42 can be engaged in the socket extension 41 on the upper end of the standard 24. Thereupon, the conductor cords 113 and 120 may be removed from the test screen case section in which they are normally stored, and the former attached to a suitable wall outlet and to the connector receptacle 110, this conductor cord 113 being the power cord. Next, the conductor cord 120 is plugged in to the connector receptacle 112, with this cord fully extended between the desk unit 1a and the test screen unit 1b, in which extended condition, it measures the proper distance between these units. Thereupon, the near phoria tester unit 92 may be removed from its storage compartment 91 in the desk unit 1a, preparatory to which the cover 96 at the front of this compartment is displaced on release of the latch members 98, 98 in the manner previously described. The operator or tester then takes a position seated at the desk or table on which the desk unit 1a is supported, with the operator located near the position of the subject so as to always have full control of both the subject and the control switches 121, 122 and 123 on the control panel 109 of the desk unit. Preliminary to conducting the vision tests, the operation of the various lamps may be checked by manipulating the switches above referred to.

Having set up the testing equipment in the manner described, it is ready for the performance of the vision tests, which are carried out by the practice of well-known techniques which are familiar to those skilled in the art, and, therefore, need not be further described herein. On completion of the tests, the testing equipment may be dismounted by reversing the set-up procedure above described in an obvious manner, and the test screen unit 1b is reassembled with the desk unit 1a by reengaging the separable hinges 7, 7 preparatory to closing the carrying case. When so closed and the latches 3, 3 and 4 are engaged, the carrying case may be easily handled or transported to another place of use, or otherwise stored away until further use of the equipment is desired.

While the specific details have been herein shown and described, the invention is not confined thereto as changes and alterations may be made without departing from the spirit thereof as defined by the appended claims.

I claim:

1. Vision testing apparatus of the class described, comprising a carrying case divided into two separable sections, one of said sections housing a test screen having an eye testing target chart depicted thereon and electrical illuminating means therefor, and the other of said sections housing circuit control instrumentalities for the illuminating means aforesaid, means for detachably connecting said control instrumentalities in circuit with said illuminating means and with a source of electrical energy, said test screen being of flexible form and mounted on roller means disposed in the test screen case section so that the test screen is extensible from and retractable into its case section, and said test screen case section being provided with a dismountable upright positioned behind the test screen and adapted to be connected to the upper free edge of the test screen to support the latter in an upright, vertically-extended position, and said upright having an illuminating means mounted thereon and disposed behind an aperture in said test screen in alignment therewith.

2. Vision testing apparatus of the class described, comprising a carrying case divided into two separable sections, one of said sections housing a test screen having an eye testing target chart depicted thereon and electrical illuminating means therefor, and the other of said sections housing circuit control instrumentalities for the illuminating means aforesaid, means for detachably connecting said control instrumentalities in circuit with said illuminating means and with a source of electrical energy, said test screen being extensible from and retractable into its case section, and said illuminating means being disposed within the test screen case section adjacent to the bottom of the test screen when the latter is extended, and in forwardly spaced relation thereto.

3. Vision testing apparatus of the class described, comprising a carrying case divided into two separable sections, one of said sections housing a test screen having an eye testing target chart depicted thereon and electrical illuminating means therefor, and the other of said sections housing circuit control instrumentalities for the illuminating means aforesaid, means for detachably connecting said control instrumentalities in circuit with said illuminating means and with a source of electrical energy, said test screen being extensible from and retractable into its case section, and said illuminating means being disposed within the test screen case section adjacent to the bottom of the test screen when the latter is extended, and in forwardly spaced relation thereto, said last-mentioned illuminating means including means for diffusing the light rays substantially uniformly on the extended test screen.

4. Vision testing apparatus of the class described, comprising a desk unit including electrical control instrumentalities, and a test screen unit including an eye testing target chart and illuminating means therefor operable from the desk unit, said units having such form that when connected together at their corresponding opposite sides, form a compact, portable, closed carrying case of elongated and generally rectangular outline, said desk unit including a desk light and selectively operable circuit control instrumentalities, and the test screen unit including an extensible test screen and illuminating means therefor, said last-mentioned illuminating means and the desk light aforesaid being selectively controlled by the circuit control instrumentalities of the desk unit.

5. Vision testing apparatus of the class described, comprising a desk unit including electrical control instrumentalities, and a test screen unit including an eye testing target chart and illuminating means therefor operable from the desk unit, said units having such form that when connected together at their corresponding opposite sides, form a compact, portable, closed carrying case of elongated and generally rectangular outline, said desk unit including a desk light and selectively operable circuit control instrumentalities, and the test screen unit including an extensible test screen and illuminating means therefor, said last-mentioned illuminating means and the desk light aforesaid being selectively controlled by the circuit control instrumentalities of the desk unit, in combination with electrical conductor means detachably connectable to the respective desk and test screen units for establishing electrical circuits therebetween when the test screen unit is disposed at the required distance from the desk unit for vision testing purposes.

6. Vision testing apparatus of the class described, comprising a desk unit including electrical control instrumentalities, and a test screen unit including an eye testing target chart and illuminating means therefor operable from the desk unit, said units having such form that when connected together at their corresponding opposite sides, form a compact, portable, closed carrying case of elongated and generally rectangular outline, said desk unit including a desk light and selectively operable circuit control instrumentalities, and the test screen unit including an extensible test screen and illuminating means therefor, said last-mentioned illuminating means and the desk light aforesaid being selectively controlled by the circuit control instrumentalities of the desk unit, in combination with electrical conductor means detachably connectable to the respective desk and test screen units for establishing electrical circuits therebetween when the test screen unit is disposed at the required distance from the desk unit for vision testing purposes, and the length of the conductor means between the respective units, when fully extended, serving as a measure of the required distance between units for the vision testing purposes.

WALTER K. LONG.

REFERENCES CITED

The following references are of record in the file of this patent:

UNITED STATES PATENTS

| Number | Name | Date |
| --- | --- | --- |
| 718,293 | Waits | Jan. 13, 1903 |
| 1,370,842 | Reeves | Mar. 8, 1921 |
| 1,558,348 | Ferree et al. | Oct. 20, 1925 |
| 1,749,612 | Scott | Mar. 4, 1930 |
| 1,776,342 | Weinland | Sept. 23, 1930 |
| 2,070,226 | Erwood | Feb. 9, 1937 |
| 2,259,651 | McClure | Oct. 21, 1941 |
| 2,345,202 | Larson | Mar. 28, 1944 |